(12) United States Patent
Berggrund

(10) Patent No.: US 11,703,355 B2
(45) Date of Patent: Jul. 18, 2023

(54) METHOD FOR CALIBRATING AN ALTITUDE SENSING STEREO VISION DEVICE OF A UAV

(71) Applicant: Everdrone AB, Säve (SE)

(72) Inventor: Mats Berggrund, Torslanda (SE)

(73) Assignee: EVERDRONE AB, Säve (SE)

( * ) Notice: Subject to any disclaimer, the term of this patent is extended or adjusted under 35 U.S.C. 154(b) by 86 days.

(21) Appl. No.: 17/516,952

(22) Filed: Nov. 2, 2021

(65) Prior Publication Data

US 2022/0136863 A1 May 5, 2022

(30) Foreign Application Priority Data

Nov. 3, 2020 (EP) .................................. 20205432

(51) Int. Cl.
*G01C 25/00* (2006.01)
*B64C 39/02* (2023.01)
(Continued)

(52) U.S. Cl.
CPC ............ *G01C 25/00* (2013.01); *B64C 39/024* (2013.01); *G01C 5/005* (2013.01); *G01C 5/06* (2013.01);
(Continued)

(58) Field of Classification Search
CPC .......... G01C 25/00; G01C 5/005; G01C 5/06; G01C 11/34; G01C 11/06; B64C 39/024; G05D 1/042; G06Q 10/0832; B64U 10/13
See application file for complete search history.

(56) References Cited

U.S. PATENT DOCUMENTS 6,148,250 A * 11/2000 Saneyoshi ............ H04N 13/239
701/4
10,337,864 B2 * 7/2019 Melby .................... G01C 11/06
(Continued)

FOREIGN PATENT DOCUMENTS

DE    102014016342 A1    5/2016
EP         0937963 A2    8/1999
WO      2017206179 A1   12/2017

OTHER PUBLICATIONS

Extended European Search Report for European Patent Application No. 20205432.6 dated Apr. 28, 2021, 7 pages.
(Continued)

*Primary Examiner* — Courtney D Heinle
*Assistant Examiner* — Andrew Thanh Bui
(74) *Attorney, Agent, or Firm* — Edell, Shapiro & Finnan, LLC

(57) ABSTRACT

The present invention relates to a method for calibrating an altitude sensing stereo vision device (122) of an unmanned aerial vehicle (100), wherein the method includes: arranging the unmanned aerial vehicle to take off from ground (G) and ascend; deriving at least one first altitude value (10a-15a) from the stereo vision device and obtaining at least one corresponding second altitude value (10b-15b) from another device (123) of the unmanned aerial vehicle during the ascent (1) of the unmanned aerial vehicle; recording the derived at least one first altitude value and the obtained at least one corresponding second altitude value as calibration data; deriving an additional first altitude value from the stereo vision device while the unmanned aerial vehicle flies a route; and adjusting the derived additional first altitude value based on the recorded calibration data.

15 Claims, 5 Drawing Sheets

(51) Int. Cl.
  *G01C 5/00* (2006.01)
  *G01C 5/06* (2006.01)
  *G05D 1/04* (2006.01)
  *G06Q 10/0832* (2023.01)
  *B64U 10/13* (2023.01)
(52) U.S. Cl.
  CPC ......... *G05D 1/042* (2013.01); *G06Q 10/0832* (2013.01); *B64U 10/13* (2023.01)

(56) References Cited

U.S. PATENT DOCUMENTS

| | | | |
|---|---|---|---|
| 11,442,144 B2* | 9/2022 | Burke | G01S 15/88 |
| 2019/0113537 A1* | 4/2019 | Zhou | G01C 25/00 |

OTHER PUBLICATIONS

Damien Eynard et al, UAV Altitude Estimation by Mixed Stereoscopic Vision, the 2010 IEEE/RSJ International Conference on Intelligent Robots and Systems, Oct. 18-22, 2010, Taipei, Taiwan, 6 pages.

* cited by examiner

METHOD FOR CALIBRATING AN ALTITUDE SENSING STEREO VISION DEVICE OF A UAV

PRIORITY CLAIM

This application claims priority to European Patent Application No. 20205432.6, filed Nov. 3, 2020, the entirety of which is incorporated herein by reference.

TECHNICAL FIELD

The present invention relates to a method for calibrating an altitude sensing stereo vision device of an unmanned aerial vehicle. The present invention also relates to a computer program product, a computer-readable storage medium, an electrical signal, and an unmanned aerial vehicle system.

BACKGROUND

Unmanned aerial vehicles (UAVs) are known to provide a wide range of services. The often small formfactor and high maneuverability of modern UAVs has made them most suitable for performing e.g. delivery or transportation of items, surveillance and aerial photography. To ensure proper control and navigation of a UAV through its surroundings, a UAV comprises a flight control unit and one or more sensors for gathering position data. Sensors commonly used on UAVs for gathering position data includes GPS receivers, barometric altimeters, accelerometers, radar, LIDAR, conventional cameras, and stereo vision systems.

The UAV may rely on an autonomous flight control system for navigation and flight control, allowing the UAV to travel from e.g. a start location to a target location with minimal or no input from a human operator. Accordingly, the flight control system can use the position data gathered by the sensors to control the flight path of the UAV, e.g. circumventing obstacles (such as buildings or vegetation). Alternatively, the position data from the sensors are presented (for example wirelessly transmitted) at an operator terminal, allowing a human operator to control the UAV using e.g. a video feed and GPS data.

One of the most important position parameters to precisely obtain during operation of a UAV, regardless if the UAV is controlled autonomously, semi-autonomously or manually, is the altitude Above Ground Level (AGL) of the UAV. An accurate reading of the altitude above ground is important, at least to make sure that the UAV does not collide with the ground, or ground features such as buildings and vegetation.

Existing solutions utilize e.g. a barometric altimeter to determine the altitude of the UAV. For example in US2019170860, a barometric pressure based altimeter is used to indicate the elevation of the UAV. A drawback of determining the altitude above ground level of a UAV with a barometric altimeter is that by deriving the altitude from a measurement of the air pressure, the terrain topography and ground features will not be taken into account. A barometric altimeter operates by correlating a reference altitude (e.g. 0 m) to a reference air pressure (e.g. the pressure at sea level), wherein any deviation in the air pressure compared to the reference pressure is correlated to a deviation in altitude from the reference altitude. As a UAV flies over a hill along a path of constant air pressure, e.g. such that the altitude Above Sea Level (ASL) is constant, the actual altitude above ground level will vary despite the fact that the altitude derived by the barometric altimeter remains constant. Accordingly, barometric altimeters perform poorly for UAVs operating over terrain topographies with height variations.

In another solution, a stereo vision device is used to determine the altitude above ground level of the UAV. The accuracy of a stereo vision device is high, and as it captures stereo images of the ground, or any ground features, it may correctly determine the altitude above terrain with varying topography. A drawback with stereo vision devices is that the maximum altitude which can be measured is limited, specifically because the separation distance between the two imaging devices of the stereo vision device. As small UAVs cannot accommodate stereo vision devices with a large separation distance, this method of measuring the altitude can only be used at low altitudes. Furthermore, any disturbance to the precise alignment of the two imaging devices may degrade the measurement accuracy of the stereo vision device.

Consequently, in existing solutions for determining the altitude above ground level for UAVs, there exists a pervasive trade-off between the size of the sensor system, the accuracy, and the operational altitude range.

SUMMARY

It is an object of the present invention to overcome at least some of the shortcomings of the previous solutions, and to provide a method allowing improved altitude sensing in a UAV.

According to a first aspect of the present invention, this and other objects is achieved by a method for calibrating an altitude sensing stereo vision device of an unmanned aerial vehicle (UAV), wherein the method comprises: arranging the unmanned aerial vehicle to take off from ground and ascend; deriving at least one first altitude value from the stereo vision device and obtaining at least one corresponding second altitude value from another device of the unmanned aerial vehicle during the ascent of the unmanned aerial vehicle; and recording the derived at least one first altitude value and the obtained at least one corresponding second altitude value as calibration data. The method may further comprise: deriving an additional first altitude value from the stereo vision device while the unmanned aerial vehicle flies a route; and adjusting the derived additional first altitude value based on the recorded calibration data without having to obtain any new information from the other device after the ascent.

That an altitude value is 'derived' from the (altitude sensing) stereo vision device may mean that the altitude value comes directly from the stereo vision device or that the altitude value is determined from a depth data image provided by the stereo vision device.

The stereo vision device of the UAV is typically a downward stereo vision device. So in at least some examples, a derived first altitude value is the distance in the nadir direction from the UAV to a closest feature below the UAV, such as the ground or a roof of a building.

The recorded first and second altitude values could be used to form a calibration table. That is, the 'calibration data' may be a calibration table. Alternatively, the recorded first and second altitude values could be used to form a graph or function relating the recorded at least one first altitude value to the recorded at least one second altitude value.

The present invention is at least partly based on the understanding that by recording at least one first altitude value and at least one corresponding second altitude value derived and obtained from the stereo vision device and the other device, respectively, during the ascent of the UAV, wherein the at least one second altitude value here is regarded as true, a subsequently derived first altitude value from the stereo vision device can be adjusted/calibrated based on the recorded values (without having to obtain any new information from the other device after the ascent), such that the stereo vision device can provide an accurate altitude reading also at high(er) altitudes outside the normally accurate range of the stereo vision device (above). In other words, the accurate/reliable altitude range of the stereo vision device may be increased. Also, since the first and second altitude values recorded as calibration data are derived and obtained during the ascent following take off, the UAV beneficially has access to fresh/updated calibration data while flying (the rest of) the route. Furthermore, any disturbance/changes to the alignment of the two cameras of the stereo vision device during a preceding flight session may be compensated for. The present adjustment/calibration of (additional) first altitude values from the stereo vision device should not be regarded as sensor fusion.

Adjusting the derived additional first altitude value based on the recorded calibration data could include: determining a second altitude value corresponding to the derived additional first altitude value based on the recorded calibration data; and adjusting the derived additional first altitude value based on the determined second altitude value.

The other device may be a barometric altimeter. From the barometric altimeter, reliable and accurate (relative) second altitude values may be obtained during the ascent, which ascent typically is vertical or at least occurs over even ground. The barometric altimeter could be reset to provide a (second) altitude value of for example zero when the UAV is on the ground before take-off.

Alternatively, the other device may comprise a barometric altimeter as well as one or more other types of sensors. In one example, the other device comprises the barometric altimeter, an accelerometer, and a Global Navigation Satellite System (GNSS) receiver, for example a GPS receiver, wherein each obtained second altitude value is a combination of data from the barometric altimeter, accelerometer, GNSS receiver (sensor fusion). In another example, the other device could be a GNSS receiver for Real-Time Kinematic (RTK) measurements.

The first and second altitude values may be heights above ground level (AGL). In case the route flown by the unmanned aerial vehicle passes over water, the (derived additional first) altitude value could at times be height above mean sea level (AMSL).

A first altitude value of the at least one first altitude value and a corresponding second altitude value of the at least one corresponding second altitude value may be derived and obtained, respectively, at substantially the same altitude of the unmanned aerial vehicle as determined by one of the altitude sensing stereo vision device and the other device, preferably as determined by the other device. For example, a first altitude value (e.g. 18.5 m) and a second corresponding altitude value (e.g. 20.0 m) may be derived and obtained, respectively, when the unmanned aerial vehicle is at the altitude 20.0 m as determined by the other device. 'Substantially' may here be construed as +/−10 cm, but could be significantly higher (e.g. +/−50 cm) if only lower accuracy is required.

A first altitude value of the at least one first altitude value and a corresponding second altitude value of the at least one corresponding second altitude value may be derived and obtained, respectively, at substantially the same time (in other words, substantially simultaneously). 'Substantially' may here be construed as +/−0.1 sec, but could be significantly longer (e.g. +/−0.5 sec) if only lower accuracy is required. Since the ascent of the UAV typically is continuous (i.e. the UAV usually does not stop and hover during the ascent and then continue the ascent), each first altitude value and each corresponding second altitude value are typically derived/obtained at substantially the same time and altitude.

A plurality of first altitude values may be derived and a plurality of corresponding second altitude values may be obtained during the ascent of the unmanned aerial vehicle and recorded as calibration data. This allows different (additional) first altitude values derived from the stereo vision device while the UAV flies the route to be properly adjusted/calibrated. The plurality of first altitude values and corresponding second altitude values could for example be: (17.0 m, 18.0 m), (18.5 m, 20.0 m), (19.0 m, 22.0 m), etc. Deriving/obtaining (and recoding) only one first altitude value and only one corresponding second altitude value may be enough if only a single altitude needs to be accurately determined by the stereo vision device, for example a predetermined altitude above a ground delivery location.

The second altitude value corresponding to the derived additional first altitude value may be determined by interpolation between recorded first and second altitude values. This may improve the adjustment/calibration of additional first altitude values derived from the stereo vision device while the UAV flies the route. The interpolation may be linear or piecewise constant or be of a more complex type, such as polynomial interpolation or spline interpolation. The corresponding second altitude value may be determined by interpolation by using at least the two closest pairs of first and second altitude values in the calibration data. Linear interpolation may be graphically represented by a graph, wherein a straight line could be drawn between (each) two subsequent pairs of recorded first and second altitude values, from which straight line new first and second altitude values could be constructed. For example, if two pairs of altitude values such as (17.0 m, 18.0 m) and (18.5 m, 20.0 m) are recorded, a new pair of altitude values may be constructed in between the recorded values with linear interpolation, resulting a new altitude value pair of e.g. (17.75 m, 19.0 m).

New (first and) second altitude values could also be constructed outside the recorded altitude range by extrapolation, for example by using at least two pairs of altitude values being the lowest or highest values with respect one of the first and second values.

The first altitude values may be derived at different increasing (predetermined) altitudes during at least a portion, with respect to altitude, of the ascent of the unmanned aerial vehicle, wherein the corresponding second altitude values are obtained at substantially the same (predetermined) altitudes. In this way, sufficient first and second altitude values may be recorded to later properly adjust/calibrate a derived additional first altitude value, without making the present method too "heavy" processing- and/or data storage-wise. The first and second altitude values may for example be recorded every x meter during at least a portion of the ascent, wherein x may be in the range of 1-5 m, such as 2 or 3 meters. Hence, the first and second altitude values could for example be recorded at 18.0 m, 20.0 m, 22.0 m, etc., as determined for example by the other device.

The step of adjusting the derived additional first altitude value based on the recorded calibration data may be performed only if the derived additional first altitude value exceeds a (predetermined) threshold value. In this way, it may not be necessary to perform the adjustment/calibration of a derived additional first altitude value at lower altitudes where the additional first altitude value derived from the stereo vision device is expected to be accurate. The threshold value may for example be predetermined based on a designated range of the stereo vision device. The threshold value may for example be in the range of 5-15 meters, such as 10 meters.

Likewise, some or all of the recorded first and second altitude values should be derived/obtained above a threshold altitude value, which (also) may be predetermined based on the designated range of the stereo vision device. The predetermined threshold altitude value may for example be in the range of 5-15 meters, such as 10 meters.

The unmanned aerial vehicle may further be arranged to ascend in a (substantially) straight and vertical trajectory. This may ensure that the calibration data become correct and useful. If the unmanned aerial vehicle takes off from and ascends above a level ground, it could ascend in a (slightly) off-vertical trajectory.

The unmanned aerial vehicle may be controlled (e.g. flown) (autonomously or by remote control by a person) based the adjusted first altitude value.

The method may for example further comprise using the adjusted additional first altitude value to arrange the unmanned aerial vehicle to hover at a predetermined altitude above a ground delivery location along the route; and arranging the unmanned aerial vehicle to deliver an object to the ground delivery location by winching the object down to the ground delivery location using a winch device of the unmanned aerial vehicle while hovering at the predetermined altitude above the ground delivery location. By accurately knowing that the UAV is at the predetermined altitude, winching down the object can be performed very fast and safe. The predetermined altitude above the ground delivery location could be in the range of 5-50 meters, such as 30.0 m. In other parts of the route, the UAV could fly different (typically higher) altitudes above ground level or above mean sea level. The object could be a defibrillator, a parcel, etc.

The steps of: arranging the unmanned aerial vehicle to take off from ground and ascend; deriving at least one first altitude value from the stereo vision device and obtaining at least one corresponding second altitude value from another device of the unmanned aerial vehicle during the ascent of the unmanned aerial vehicle; and recording the derived at least one first altitude value and the obtained at least one corresponding second altitude value as calibration data may be repeated for each flight session of the unmanned aerial vehicle. A 'flight session' may include the take-off, the ascent, flying (the rest of) the route, and a landing. By repeating the above mentioned steps, the UAV beneficially has fresh/updated calibration data every time it flies.

The stereo vision device may comprise a first camera and a second camera, wherein the distance between the first camera and the second camera may be in the range of 4 to 15 cm. These distances are suitable considering the typical overall size of an unmanned aerial vehicle, but limit the designated range of the stereo vision device, whereby the present adjustment/calibration of first altitude values derived from the stereo vision device becomes extra useful.

According to a second aspect of the invention, there is provided a (non-transitory) computer program product comprising computer program code to perform, when executed on a computer, the steps of: arranging an unmanned aerial vehicle to take off from ground and ascend; deriving at least one first altitude value from an altitude sensing stereo vision device of the unmanned aerial vehicle and obtaining at least one second altitude value from another device of the unmanned aerial vehicle during the ascent of the unmanned aerial vehicle; recording the derived at least one first altitude value and the obtained at least one corresponding second altitude value as calibration data; deriving an additional first altitude value from the stereo vision device while the unmanned aerial vehicle flies a route; and adjusting the derived additional first altitude value based on the recorded calibration data without having to obtain any new information from the other device after the ascent. This aspect may exhibit the same or similar features and technical effects as the first aspect, and vice versa. The computer could be a control unit of the unmanned aerial vehicle.

According to a third aspect of the present invention, there is provided a computer-readable storage medium comprising the computer program product according to the second aspect.

According to a fourth aspect of the present invention, there is provided an electrical signal embodied on a carrier wave and propagated on an electrical medium, the electrical signal comprising the computer program product according to the second aspect.

According to a fifth aspect of the present invention, there is provided an unmanned aerial vehicle system, comprising: an unmanned aerial vehicle comprising a stereo vision device and another device; and a control unit configured to: derive at least one first altitude value from the stereo vision device and obtain at least one corresponding second altitude value from the other device during an ascent of the unmanned aerial vehicle after take-off from ground; record the derived at least one first altitude value and the obtained at least one corresponding second altitude value as calibration data, wherein the obtained at least one corresponding second altitude value is regarded as true value(s); derive an additional first altitude value from the stereo vision device while the unmanned aerial vehicle flies a route; and adjust the derived additional first altitude value based on the recorded calibration data, preferably without having to obtain any new information from the other device after the ascent. This aspect may exhibit the same or similar features and technical effects as any of the previous aspects, and vice versa. The control unit may be included in the unmanned aerial vehicle or be separate and/or remote from the unmanned aerial vehicle. The control unit may be a flight control unit (FCU).

These and other aspects, features, and implementations can be expressed as methods, apparatus, systems, components, program products, means or steps for performing a function, and in other ways. Further advantages and advantageous features of the invention are disclosed in the following description and drawings.

BRIEF DESCRIPTION OF THE DRAWINGS

These and other aspects of the present invention will now be described in more detail, with reference to the appended drawings showing a currently preferred embodiment of the invention.

DETAILED DESCRIPTION

Figure 1:
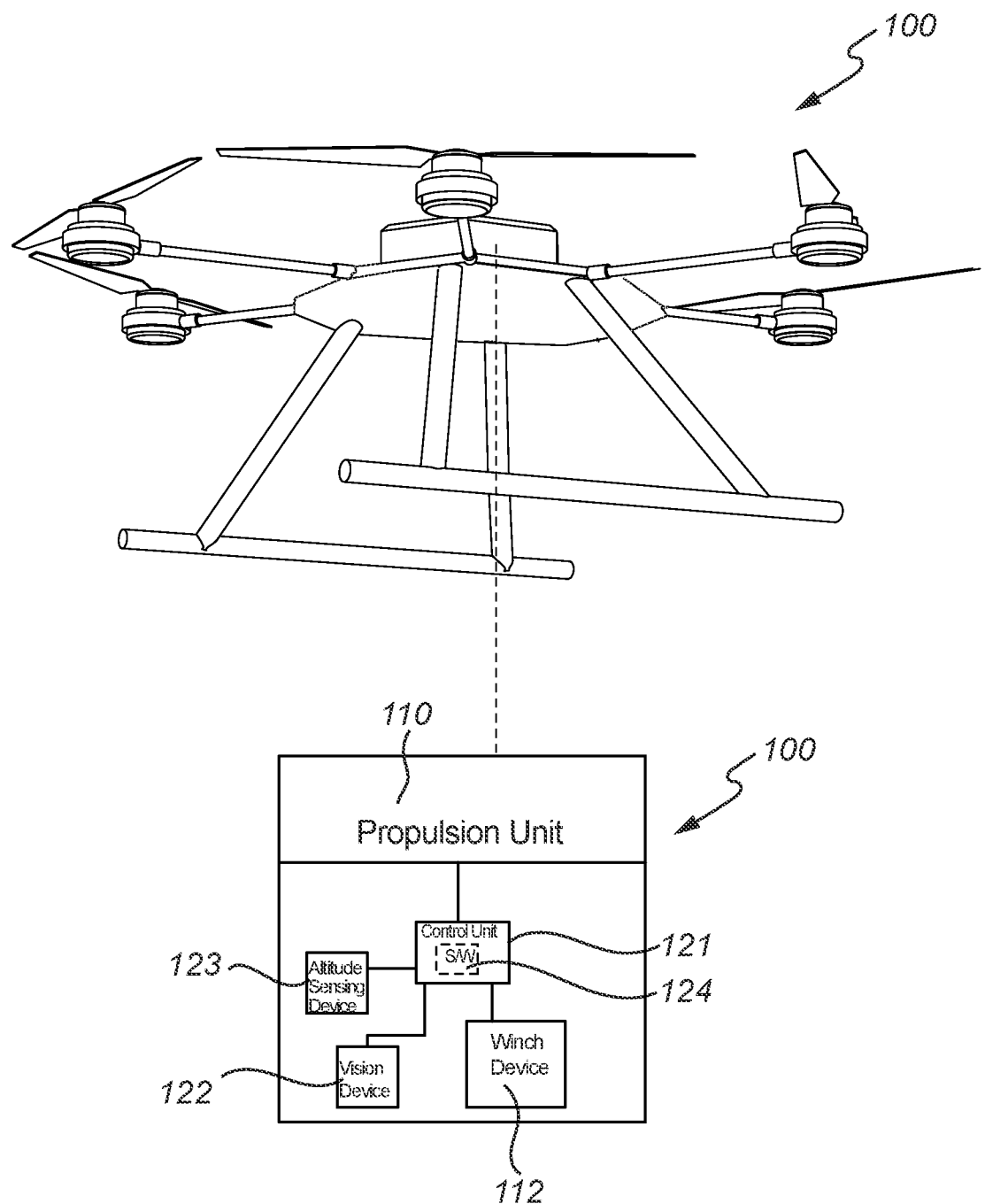
FIG. 1 is a schematic drawing of an unmanned aerial vehicle (UAV) according to one or more embodiments.

With reference to FIG. 1, an unmanned aerial vehicle (UAV) 100 is illustrated in a perspective view with a component diagram. The UAV 100 may be at least partly autonomous. The UAV may also be referred to as a drone.

The UAV 100 may comprise a propulsion unit 110. The propulsion unit 110 comprises one or more propulsion devices enabling the UAV 100 to e.g. take-off and land, stay airborne, hover, and fly along an aerial route. The one or more propulsion devices could be a plurality of arms each provided with a motor (e.g., an electric motor) connected to a propeller.

The UAV 100 may also comprise a winch device 112. The winch device 112 allows the UAV 100 to deliver an object to a ground delivery location by winching the object down to the ground delivery location using the winch device 112 while hovering above the ground delivery location. The winch device 112 may for example comprise a reel, a tether windable onto the reel, and a motor for rotating the reel.

The UAV 100 may also comprise a battery pack for powering (among other things) the motors of the propulsion unit 110 and the motor of the winch device 112.

The UAV 100 may also comprise a pair of landing skids.

The UAV 100 further comprises an altitude sensing stereo vision device 122 and another altitude sensing device 123. The stereo vision device 122 is a downward stereo vision device. In other words, the stereo vision device 122 may be directed straight downwards ("look" straight down) at zero pitch and zero roll of the UAV 100. The stereo vision device 122 may comprise a first camera and a second camera. The distance between the first camera and the second camera may be in the range of 4 to 15 cm. The stereo vision device 122 may for example be an Intel RealSense Depth Camera D435. The another altitude sensing device 123 may for example be a barometric altimeter.

The UAV 100 further comprises a control unit 121. The control unit 121 may be connected to one or more of the propulsion unit 110, the winch device 112, the stereo vision device 122, and the other device 123. The control unit 121 may be configured to perform various specific steps or actions detailed in the following by hardware or software (computer program product) 124 or a combination thereof. Any software 124 may run or be executed on the control unit 121 using a processor and a memory of the computer device control unit 121.

Figure 2:
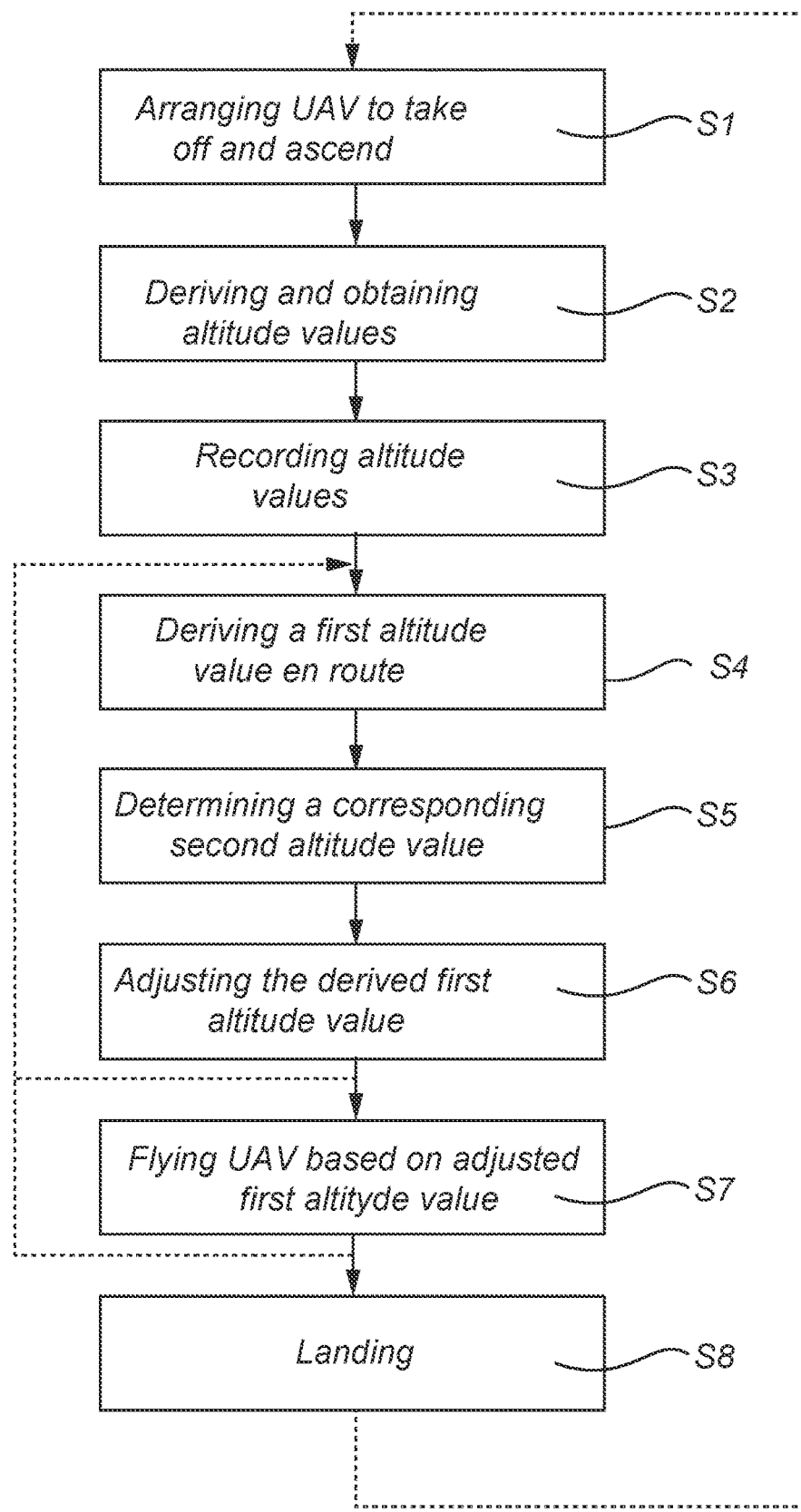
FIG. 2 depicts a flow chart illustrating a method according to one or more embodiments.

FIG. 2 depicts a flow chart illustrating a method for calibrating the stereo vision device 122 of the UAV 100 according to one or more embodiments. The method comprises operations S1-S8.

Figure 3A:
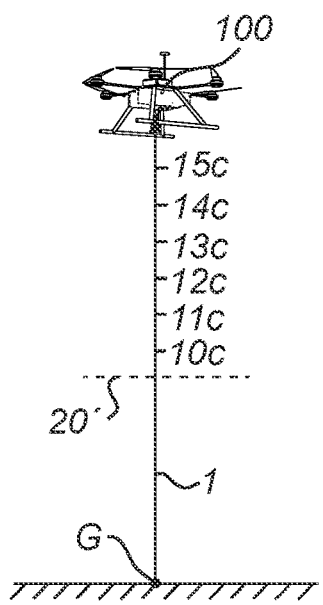
FIG. 3a illustrates an unmanned aerial vehicle taking off and ascending in accordance with one or more embodiments.

With further reference to FIG. 3a, at operation S1, the UAV 100 is arranged to (autonomously) take off from ground G and ascend. This may be performed by the control unit 121 instructing the propulsion unit 110 accordingly. The UAV 100 may ascend in a substantially straight and vertical trajectory, as illustrated in FIG. 3a. The ascent 1 of the UAV 100 is preferably continuous and/or monotonic. 'Monotonic' here means that the altitude of the UAV 100 never decreases during the ascent 1. The ascent 1 may be part of a route that the UAV 100 flies.

At operation S2, at least one first altitude value is derived from the stereo vision device 122 and at least one corresponding second altitude value is obtained from the another device (barometric altimeter) 123 during the ascent 1 of the UAV 100.

'Deriving' a first altitude value from the stereo vision device 122 may imply that the altitude value comes directly from the stereo vision device 122 or that the altitude value is determined from a depth data image provided by the stereo vision device 122. The depth data image may comprise a plurality of point values indicative of the measured depth for each point in the depth data image (i.e. the distance from objects within the field of view of the depth data image to the stereo vision device 122), and the first altitude value may, for example, be derived by averaging the depth point values over at least a portion of the depth data image.

Furthermore, it is appreciated that the altitude values here are heights above ground (level) G.

At operation S3, the derived first altitude value(s) and obtained second altitude value(s) are recorded as calibration data, e.g. onto a storage medium of the control unit 121.

Figure 4A:
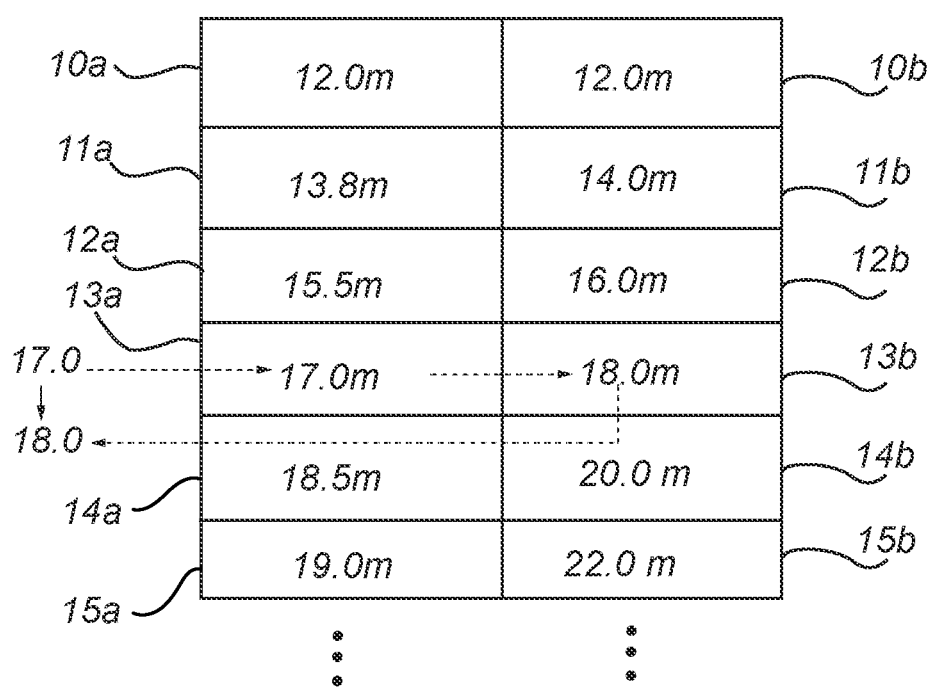
FIGS. 4a-c depict calibration data.
Figure 4B:
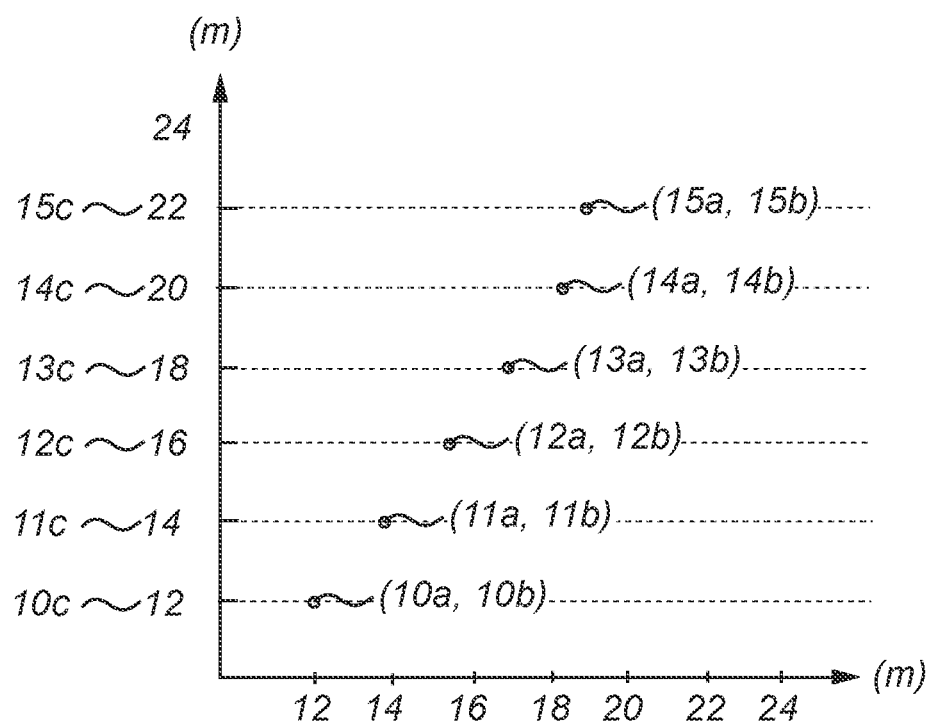

Exemplary calibration data are shown in FIGS. 4a-b. In FIG. 4a, recorded first altitude values 10a-15a and corresponding recorded second altitude values 10b-15b are used to form a calibration table. The first altitude values 10a-15a are in the left column, and the second altitude values 10b-15b are in the right column. In FIG. 4b, recorded first altitude values 10a-15a and corresponding recorded second altitude values 10b-15b are plotted in a chart as pairs/data points. The horizontal axis is altitude determined by the stereo vision device 122, and the vertical axis is altitude determined by the other device 123.

First altitude value 10a and second altitude value 10b (on the same row in the calibration table of FIG. 4a) correspond in that they are derived/obtained at substantially the same altitude of the UAV 100, preferably as determined by the other device 123. The same altitude for the values 10a and 10b is 12.0 m. Since the ascent 1 of the UAV 100 typically is continuous, the values 10a and 10b may be derived/obtained at substantially the same time, i.e., simultaneously. Likewise, second altitude value 11b corresponds to first altitude value 11a (both obtained/derived at 14.0 m as determined by the other device 123), and so on.

The first altitude values 10a-15a may be derived at different increasing predetermined discrete altitudes 10c-15c (see e.g. FIG. 3a) during at least a portion—with respect to altitude—of the ascent 1 of the UAV 100, wherein the corresponding second altitude values 10b-15b are obtained at substantially the same altitudes 10c-15c. In the exemplary calibration data of FIGS. 4a-b, the first and second altitude values 10a-15a and 10b-15b are derived/obtained and recorded every 2 meters during a portion of the ascent, namely at 12.0 m (altitude 10c), 14.0 m (11c), 16.0 m (12c), 18.0 m (13c), 20.0 m (14c), and 22.0 m (15c), as determined by the other device 123.

Furthermore, all of the recorded first and second altitude values 10a-15a and 10b-15b may be derived/obtained above a threshold altitude value 20', for example 10 meters. The threshold altitude value 20' may be predetermined based on a conventional designated range (or rated maximum altitude up to which derived altitude values conventionally are considered accurate/reliable) of the stereo vision device 122. Alternatively, the threshold altitude value 20' could be dynamically set as the difference between a first altitude value and a corresponding second altitude value exceeds a predetermined value.

As an upper limit, first altitude values and corresponding second altitudes values may be recorded for as long as first altitude values can be derived from the stereo vision device 122 during the ascent 1 of the UAV 100. In practical applications, this upper limit could be in the range of 30-100 m.

Figure 3B:
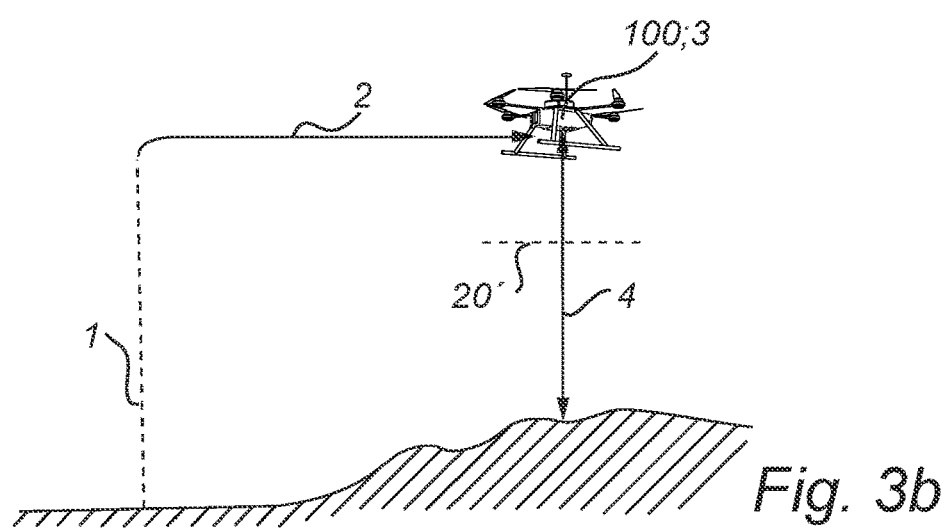
FIG. 3b illustrates an unmanned aerial vehicle flying a route in accordance with one or more embodiments.

Returning to FIG. 2, at operation S4, an additional ("en route") first altitude value is derived from the stereo vision device 122 while the UAV 100 flies a route, typically a forward flight portion 2 of the route following the ascent 1, see FIG. 3b. This additional first altitude value may for example derived at a position 3 along the forward flight portion 2 of the route. The route (including ascent 1 and forward flight portion 2) that the UAV 100 flies may for example be less than 100 km or less than 20 km and/or has a duration less than 100 min or less than 20 min.

At operation S5, a second altitude value (for calibration) corresponding to the additional first altitude value derived in operation S4 is determined based on the recorded calibration data.

If the additional first altitude value derived in operation S4 matches a recorded first altitude value of the calibration data, the second altitude value determined in operation S5 is the recorded second altitude value of the calibration data that corresponds to said recorded first altitude value of the calibration data. For example, the additional first altitude value derived in operation S4 is 17.0 m matching recorded first altitude value 13a in FIG. 4a, whereby the second altitude value determined in operation S5 is 18.0 m (=second altitude value 13b).

Figure 4C:
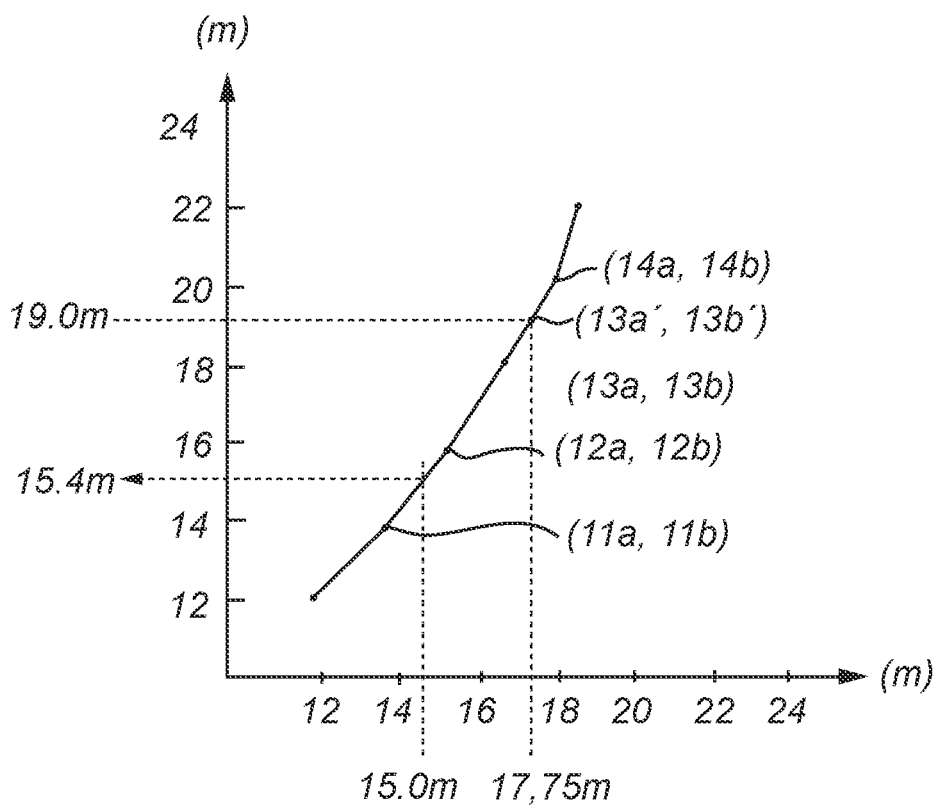

In another example, if the additional first altitude value derived in operation S4 is say 15.0 m, (linear) interpolation as shown in FIG. 4c between recorded first altitude and second altitudes values 11a, 11b and 12a, 12b yields a corresponding second altitude value of 15.4 m determined in operation S5. It is hence appreciated that new altitude values may be constructed on an 'ad-hoc' or 'as-needed' basis while the UAV 100 flies the forward flight portion 2 of the route.

At operation S6, the additional first altitude value derived in operation S4 is adjusted based on the second altitude value determined in operation S5 (that is, the derived additional first altitude value is adjusted based on the recorded calibration data). This may for example be achieved by replacing the additional first altitude value derived in operation S4 with the second altitude value determined in operation S5, or by adding the difference between the second altitude value determined in operation S5 and the additional first altitude value derived in operation S4 to the first altitude value derived in operation S4. If, for example, the additional first altitude value derived in operation S4 at position 3 is 17.0 m, in operation S6, that value is replaced by the more accurate second altitude value 18.0 m determined in operation S5, as illustrated in FIG. 4a. Or (18.0−17.0)+17.0=18.0 m. Hence, the UAV 100 may accurately determine that its height above ground level 4 at position 3 is 18.0 m using the stereo vision device 122, even if this height above ground level is above the (conventional) designated range of the stereo vision device 122.

At operation S7, the UAV 100 may be controlled/flown based the adjusted additional first altitude value. The UAV 100 may for example use the adjusted additional first altitude value to determine that it maintains a minimum height above ground level.

Figure 3C:
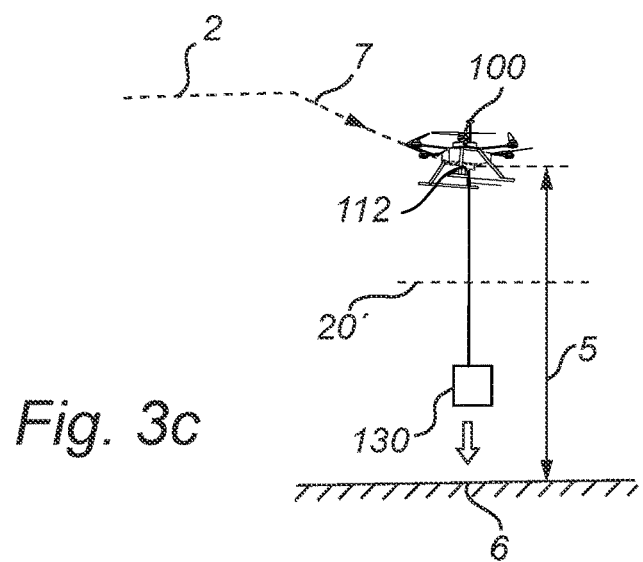
FIG. 3c illustrates an unmanned aerial vehicle arranged to deliver an object to a ground delivery location while hovering at a predetermined altitude above the ground delivery location in accordance with one or more embodiments.

In a specific application illustrated in FIG. 3c, the adjusted additional first value from operation S6 may be used to accurately arrange the UAV 100 to hover a predetermined altitude (height above ground level 5) above a ground delivery location 6. This predetermined altitude is typically higher than threshold 20'. Furthermore, the UAV 100 typically hovers at the predetermined altitude 5 above the ground delivery location 6 following a decent 7 from a higher cruising altitude of the forward flight portion 2 of the route.

The UAV 100 then delivers an object 130 to the ground delivery location 6 by winching the object 130 down to the ground delivery location 6 using the winch device 112 while hovering at the predetermined altitude 5 above the ground delivery position 6.

Returning to FIG. 2, it should be noted that steps/operations S4-S6 (and S7) could be repeated to accurately determine the height above ground level of the UAV 100 using the stereo vision device 122 (even above 20') at different positions along the route. Operations S4-S6 (and S7) may be iteratively repeated continuously.

It should also be noted that operations S5 and S6 (and S7) may be performed (only) if the derived first altitude value in operation S4 exceeds a threshold value, which may be the same as the threshold altitude value 20'. Below that threshold value, the altitude value derived from the stereo vision device 122 are assumed to be accurate even without the present calibration (and operations S5 and S6 may therefore be omitted).

Furthermore, the method may further comprise the optional operation S8 of landing the UAV 100, ending a flight session. As further illustrated in FIG. 2, operations S1-S6 (and S7 and/or S8) may be repeated for each flight session of the UAV 100. This way, the UAV 100 will have fresh/updated calibration data for each flight session.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

For example, new first altitude values 13a' and corresponding second altitude values 13b' could be constructed between the recorded first and second altitude values by interpolation (even) before operation S4/S5. These new first and second altitude values (e.g. 17.75 m, 19.0 m), as well as other such values, may be added to the existing calibration data. They could for example be added (as a new row) to the calibration table of FIG. 4a.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", "left," "right," "front," "rear," "side," "height," "length," "width," "interior," "exterior," "inner," "outer" or other similar terms merely describe points of reference and do not limit the present invention to any particular orientation or configuration. When used to describe a range of dimensions and/or other characteristics (e.g., time, pressure, temperature, distance, etc.) of an element, operations, conditions, etc. the phrase "between X and Y" represents a range that includes X and Y.

Further, the term "exemplary" is used herein to describe an example or illustration. Any embodiment described herein as exemplary is not to be construed as a preferred or advantageous embodiment, but rather as one example or illustration of a possible embodiment.

Further, the present disclosure may repeat reference numerals and/or letters in the various examples. This repetition is for the purpose of simplicity and clarity, and does not in itself dictate a relationship between the various embodiments and/or configurations discussed.

When used herein, the term "comprises" and its derivations (such as "comprising", "including," "containing," etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the similar terms, such as, but not limited to, "about," "around," and "substantially."

As used herein, unless expressly stated to the contrary, use of the phrase "at least one of", "one or more of", "and/or", and variations thereof are open-ended expressions that are both conjunctive and disjunctive in operation for any and all possible combination of the associated listed items. For example, each of the expressions "at least one of X, Y and Z", "at least one of X, Y or Z", "one or more of X, Y and Z", "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Further as referred to herein, "at least one of" and "one or more of" can be represented using the "(s)" nomenclature (e.g., one or more element(s)).

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements.

The invention claimed is:

1. A method for calibrating an altitude sensing stereo vision device of an unmanned aerial vehicle, wherein the method comprises:
arranging the unmanned aerial vehicle to take off from ground and ascend;
deriving at least one first altitude value from the stereo vision device and obtaining at least one corresponding second altitude value from another device of the unmanned aerial vehicle during the ascent of the unmanned aerial vehicle;
recording the derived at least one first altitude value and the obtained at least one corresponding second altitude value as calibration data;
deriving an additional first altitude value from the stereo vision device while the unmanned aerial vehicle flies a route; and
adjusting the derived additional first altitude value based on the recorded calibration data without having to obtain any new information from the other device after the ascent.

2. The method according to claim 1, wherein the other device comprises a barometric altimeter.

3. The method according to claim 1, wherein said first and second altitude values are heights above ground level.

4. The method according to claim 1, wherein said at least one first altitude value and said at least one corresponding second altitude value are derived and obtained, respectively, at substantially a same altitude of the unmanned aerial vehicle as determined by one of the stereo vision device and the other device.

5. The method according to claim 1, wherein said at least one first altitude value and said at least one corresponding second altitude value are derived and obtained, respectively, at substantially a same time.

6. The method according to claim 1, wherein a plurality of first altitude values are derived and a plurality of corresponding second altitude values are obtained during the ascent of the unmanned aerial vehicle and recorded as the calibration data.

7. The method according to claim 6, wherein a subsequent derived additional first altitude value is determined by interpolation between recorded first and second altitude values.

8. The method according to claim 6, wherein the plurality of first altitude values are derived at different increasing altitudes during at least a portion, with respect to altitude, of the ascent of the unmanned aerial vehicle, and wherein the plurality of corresponding second altitude values are obtained at substantially same altitudes as the plurality of first altitude values.

9. The method according to claim 7, wherein the plurality of first altitude values are derived at different increasing altitudes during at least a portion, with respect to altitude, of the ascent of the unmanned aerial vehicle, and wherein the plurality of corresponding second altitude values are obtained at substantially same altitudes as the plurality of first altitude values.

10. The method according to claim 1, wherein adjusting the derived additional first altitude value based on the recorded calibration data is performed in response to the derived additional first altitude value exceeding a threshold value.

11. The method according to claim 1, wherein the unmanned aerial vehicle is arranged to ascend in a substantially straight and vertical trajectory.

12. The method according to claim 1, wherein the method further comprises:
using the adjusted additional first altitude value to hover the unmanned aerial vehicle at a predetermined altitude above a ground delivery location along said route; and
delivering an object to the ground delivery location by winching the object down to the ground delivery location using a winch device of the unmanned aerial vehicle while hovering at the predetermined altitude above the ground delivery location.

13. The method according to claim 1, wherein each subsequent flight session of the unmanned aerial vehicle repeats the steps of:
arranging the unmanned aerial vehicle to take off from the ground and ascend;

deriving the at least one first altitude value from the stereo vision device and obtaining the at least one corresponding second altitude value from the other device of the unmanned aerial vehicle during the ascent of the unmanned aerial vehicle; and recording the derived at least one first altitude value and the obtained at least one corresponding second altitude value as the calibration data.

14. A non-transitory computer-readable storage medium storing instructions that, when executed by a processor, cause the processor to:

arrange an unmanned aerial vehicle to take off from ground and ascend;

derive at least one first altitude value from an altitude sensing stereo vision device of the unmanned aerial vehicle and obtaining at least one second altitude value from another device of the unmanned aerial vehicle during the ascent of the unmanned aerial vehicle;

record the derived at least one first altitude value and the obtained at least one second altitude value as calibration data;

derive an additional first altitude value from the stereo vision device while the unmanned aerial vehicle flies a route; and adjust the derived additional first altitude value based on the recorded calibration data without having to obtain any new information from the other device after the ascent.

15. An unmanned aerial vehicle system, comprising:

an unmanned aerial vehicle comprising a stereo vision device and another device; and a control unit configured to:

derive at least one first altitude value from the stereo vision device and obtain at least one corresponding second altitude value from the other device during an ascent of the unmanned aerial vehicle after take-off from ground;

record the derived at least one first altitude value and the obtained at least one corresponding second altitude value as calibration data, wherein the obtained at least one corresponding second altitude value is regarded as a true value;

derive an additional first altitude value from the stereo vision device while the unmanned aerial vehicle flies a route; and adjust the derived additional first altitude value based on the recorded calibration data without having to obtain any new information from the other device after the ascent.

* * * * *